US 6,771,678 B1

(12) United States Patent
Willner et al.

(10) Patent No.: US 6,771,678 B1
(45) Date of Patent: Aug. 3, 2004

(54) LASER SYSTEM AND METHOD OF OPERATION HAVING IMPROVED SIGNAL CONTINUITY AND SAFETY

(75) Inventors: Barry E. Willner, Briarcliff Manor, NY (US); James M. Dunn, Fresno, CA (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 09/593,076

(22) Filed: Jun. 13, 2000

(51) Int. Cl.$^7$ .............................. H01S 3/00; H01S 3/14
(52) U.S. Cl. ................ 372/38.1; 372/38.01; 372/38.03; 372/38.08; 372/38.09; 372/68
(58) Field of Search .............................. 372/38.1, 38.01, 372/38.03, 38.08, 38.09, 68, 23, 66, 38.02

(56) References Cited

U.S. PATENT DOCUMENTS

| 3,636,473 | A | * | 1/1972 | Young .......................... 372/33 |
| 4,922,480 | A | * | 5/1990 | Bosch ........................... 370/3 |
| 5,007,737 | A | | 4/1991 | Hirleman, Jr. |
| 5,030,004 | A | | 7/1991 | Grant et al. ................. 356/153 |
| 5,247,866 | A | * | 9/1993 | O'Malley ......................... 89/6 |
| 5,345,455 | A | * | 9/1994 | Gabriagues ................... 372/50 |
| 5,461,692 | A | * | 10/1995 | Nagel .......................... 385/127 |
| 5,501,680 | A | * | 3/1996 | Kurtz ............................ 606/9 |
| 6,217,570 | B1 | * | 4/2001 | Nevyas .......................... 606/5 |
| 6,248,103 | B1 | * | 6/2001 | Tannenbaum .................. 606/9 |
| 6,285,646 | B1 | * | 9/2001 | Yoo ....................... 369/112.26 |

FOREIGN PATENT DOCUMENTS

| JP | 60-216642 | 10/1985 |
| JP | 60-245324 | 12/1985 |
| JP | 61-234636 | 10/1986 |
| JP | 61234636 | * 10/1986 |
| JP | 08-293834 | 11/1986 |
| JP | 62-135786 | 6/1987 |
| JP | 01-127186 | 5/1989 |

(List continued on next page.)

OTHER PUBLICATIONS

Strickland et al, Effects of fog on the bit–error rate of a free–space laser communication system, Jan. 20, 1999, Applied Optics vol. 38, No. 3, pp. 424431.*
Strickland et al., "Effects of Fog on the Bit–Error Rate of a Free–Space laser Communication System", Applied Optics, vol. 38, No. 3, Jan. 1999, pp. 424–431.

(List continued on next page.)

Primary Examiner—Paul Ip
Assistant Examiner—Armando Rodriguez
(74) Attorney, Agent, or Firm—Morgan & Finnegan, LLP; Joseph C. Redmond, Jr.

(57) ABSTRACT

An improved laser system and method of operation provides signal continuity and safety in the event of accidental interruption of the laser beam. At the transmitting end, a main laser generates a beam, which is surrounded by a low powered guard beam generated by a pulsed laser. At the receiver, a leas system includes a main lens for receiving the main laser beam and a surrounding annular segmented set of lenses acting as a set of parallel receivers for the surrounding guard beam. A trigger circuit is connected to the parallel receivers. In operation, the guard beam insulates the main laser beam and detects interruptions. When the guard beam is interrupted at any point along the length of the beam, one or more of the parallel receivers will be blocked, and a signal will be generated by the trigger circuit to activate a return laser to alter the performance of the main laser, including shutdown of the beam. Upon shutdown, the current stream of bits or packets to the main laser is buffered. Once the guard band interruption is cleared, the trigger signal ends to terminate the return laser. With the termination of the return laser, the buffer circuit is discharged to the main laser, which returns to the normal state whereby signal continuity and safety of operation are achieved.

18 Claims, 6 Drawing Sheets

FOREIGN PATENT DOCUMENTS

| | | |
|---|---|---|
| JP | 1269188 A | 10/1989 |
| JP | 5-218972 A | 8/1993 |
| JP | 06-021893 | 1/1994 |
| JP | 06-252858 | 9/1994 |
| JP | 09-061543 | 3/1997 |
| JP | 6-21893 * | 1/1998 |
| JP | 11-2705018 | 10/1999 |
| JP | WO00/17691 | 3/2000 |

OTHER PUBLICATIONS

Proceedings of the 2000 IECE General Conference, Institute of Electronics, Information and Communication Engineers, Mar. 28–31, 2000, Hiroshima Univ., Higashi–Hiroshima, 3 pgs.

* cited by examiner

LASER SYSTEM AND METHOD OF OPERATION HAVING IMPROVED SIGNAL CONTINUITY AND SAFETY

BACKGROUND OF INVENTION

1. Field of Invention

This invention relates to laser systems and methods of operation. More particularly, the invention relates to a laser system and method of operation having improved signal continuity and safety.

2. Background Discussion

Laser systems have many applications in the commercial, medical and educational environments. Laser light differs from ordinary light in three ways: it is monochromatic, coherent and directional. One of the key issues with lasers is their safety of operation. A great deal of energy is focused on a small are which may be beneficial or destructive according to the environment. For example, laser systems employed by laser pointer in an educational presentation may cause accidental exposure of the laser beam by the audience. Thus, the laser frequency and power output are minimized to avoid tissue damage should accidental exposure to the beam occur.

Another key issue with this laser, is their continuity of operations in the event of a safety problem. For example, lasers are often used for short-range, line-of-sight communications such as between two buildings separated by a right of way that prevents buried cables. The communication lasers operate at a much higher power than educational pointers. However, even though the laser system is carefully aligned from a transmitter to a receiver and sealed from accidental exposure by maintenance personnel, the possibility still exists for the beam to be broken by maintenance personnel or birds flying through the area, etc. The inadvertent exposures "breaks " the beam and cause loss of signal continuity, as well as potential personal damage to the object breaking the beam. As a result, laser safety and signal continuity are often addressed by mechanical shielding and interlocks around the emitter and receiver and reduced power which contributes to reduced signal range. In any case, the transmitted laser beam is not enclosed as a protective measure from accidental interruption of the beam.

Prior art related to laser beam safety and signal continuity includes the following:

WO/017691 A1, entitled "Coupling Lens and Semiconductor Laser Module", issued Mar. 30, 2000 and filed Sep. 10, 1999, discloses a coupling lens for coupling the emerging length in the emerging length beam from a semiconductor laser to an optical fiber. The coupling lens comprises a single lens integral with a diffraction lens composed of concentric ring bands on the planes of incidents or plane of emergence of a single lens. The diffraction lens has a positive refractive power. The relief function of the diffraction lens is generally an isosceles triangle. When the coupling lens is used with a semiconductor module, the output power of the module can be so controlled as to conform with the safety standards even if the attenuation film, polarizer or optical fiber comes off without any control circuits or automatically stopping the lasing of the laser.

JP 1269188A2, entitled "Bar Code Scanning Device", issued Oct. 26, 1989 and filed Dec. 20, 1988, discloses a laser beam scanning device having a window arranged mat side and upper part of the transfer path of an article being scanned. The surface of the window is arranged to be inclined obliquely upwards at an angle larger than 90° to the transfer surface of the transfer path and plural scanning luminous fluxes with mutually different directions are directed to the scanning area on the transfer surface in front of the window. The laser-scanning device is oriented so as to not directly project the luminous flux to an operator performing a medical operation in front of the scanning area. That is, commonly, the head part and the breast part of the operator do not receive the scanning laser beam at all. Thus, an optimum workplace is obtained in the aspects of human engineering and also in safety.

JP 5218972 A2 entitled, "Free Space Laser Communication Equipment and Method", issued Aug. 27, 1993 and filed Jul. 30, 1992, discloses a terminal equipment which sends a laser beam at a level below a safety threshold. A microprocessor sends a terminal equipment identification code together with a beam. An Acknowledgment signal from the receiving terminal equipment is monitored and the window signal is received. The microprocessor activates the laser in a normal level of high power to enhance a communication performance. When the acknowledgment signal is monitored and the signal is not received for a prescribed time or, it is regarded that a disturbance or misalignment of the beam has taken place, the laser power is reduced to a level safe for transmission. Thus, the safety of an unconscious observer is assured and the communication performance is improved.

None of the prior art discloses a laser beam insulated from intervening objects and protected from signal loss due to objects blocking the light beam and in the event of such blocking performing recovery of the signal in an efficient manner.

SUMMARY OF THE INVENTION

An object of the invention is an improved laser system and method of operation having signal continuity and safety of operation from intervening objects.

Another object is an improved laser system and method of operation providing a central beam and a surrounding guard beam preventing signal interruption from intervening objects Another object is an improved laser system and operation for restoring signal continuity without loss of information when the laser is interrupted by an intervening object.

Another object is a laser receiver having a dual lens system, one lens receiving a main laser beam and the other lens acting as parallel receivers for a surrounding guard beam.

Another object is a trigger circuit recognizing interruption of a laser guard beam surrounding a main laser beam and altering the performance of the main laser beam according to the nature of the interruption Another object is an improved laser system and method of operation for medical application in confining the laser beam to a defined area.

These and other objects, features and advantages of the invention are achieved in a laser system comprising a main laser beam, typically provided by a high power Continuous Wave (CW) laser. The main laser beam is surrounded by a guard laser beam coaxially aligned with the main laser beam. The guard laser beam is typically provided by a low power, pulse beam laser. A receiver includes a single lens and a surrounding angular segmented set of mirrors and lens acting as parallel receivers. The main laser beam is received by the single lens and provided to a receiver. The guard laser beam is received by the annular, segmented set of mirrors and lens acting and provided to a trigger circuit. In operation, the guard beam insulates the main laser beam from interruption. If the guard beam is interrupted at any point along the length of the beam, one or more of the parallel receivers will be blocked and a signal will be provided to trigger circuit to alter the performance of the main laser beam, including shut down, via a return laser transmitter to the main laser. The main laser performance is altered according to the nature of the interruption. In the case of shut down of the main laser, the current stream of bits or packets is buffered and discharged when the main laser is turned on after the interruption is cleared. If the main laser is a pulsed beam laser, the shutdown may consist of simply not pulsing the laser at the next pulse time. The guard laser beam is never deactivated during shut-down of the main laser. Once the guard beam interruption is cleared, the trigger signal ends and the main laser is reactivated. To prevent cross talk between the CW and pulsed beam laser, different lasing materials and different frequencies are used. If the main and guard lasers are pulse lasers, then different pulse rates are used. The system may also include sensors for detecting climatic conditions affecting the guard beam. For example, a driving rainstorm or dust clouds, both of which disperse the guard band, but not alter the operation of the main laser. External sensors detect these conditions and activate the trigger circuit, which would maintain the continuity of the main laser in the presence of the climatic condition. Optionally, the laser return system may be activated by the trigger system to increase or reduce the power level of the main laser. Thus, the continuity, safety and signal restoration of a laser beam communication system are provided against intervening objects.

DESCRIPTION OF DRAWINGS

The invention will be further understood from the following detailed description of a preferred embodiment taken in conjunction with an appended drawing, in which.

DESCRIPTION OF PREFERRED EMBODIMENT

Figure 1:
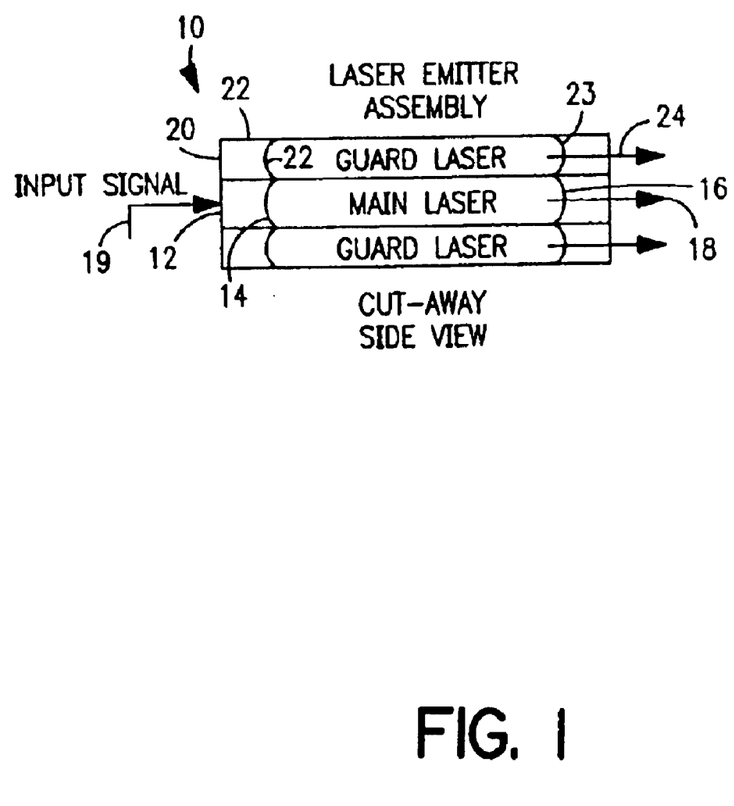
FIG. 1 is a representation of a laser system providing a main laser beam and a surrounding guard beam for improved safety and signal continuity and incorporating the principles of the present invention.
Figure 1A:
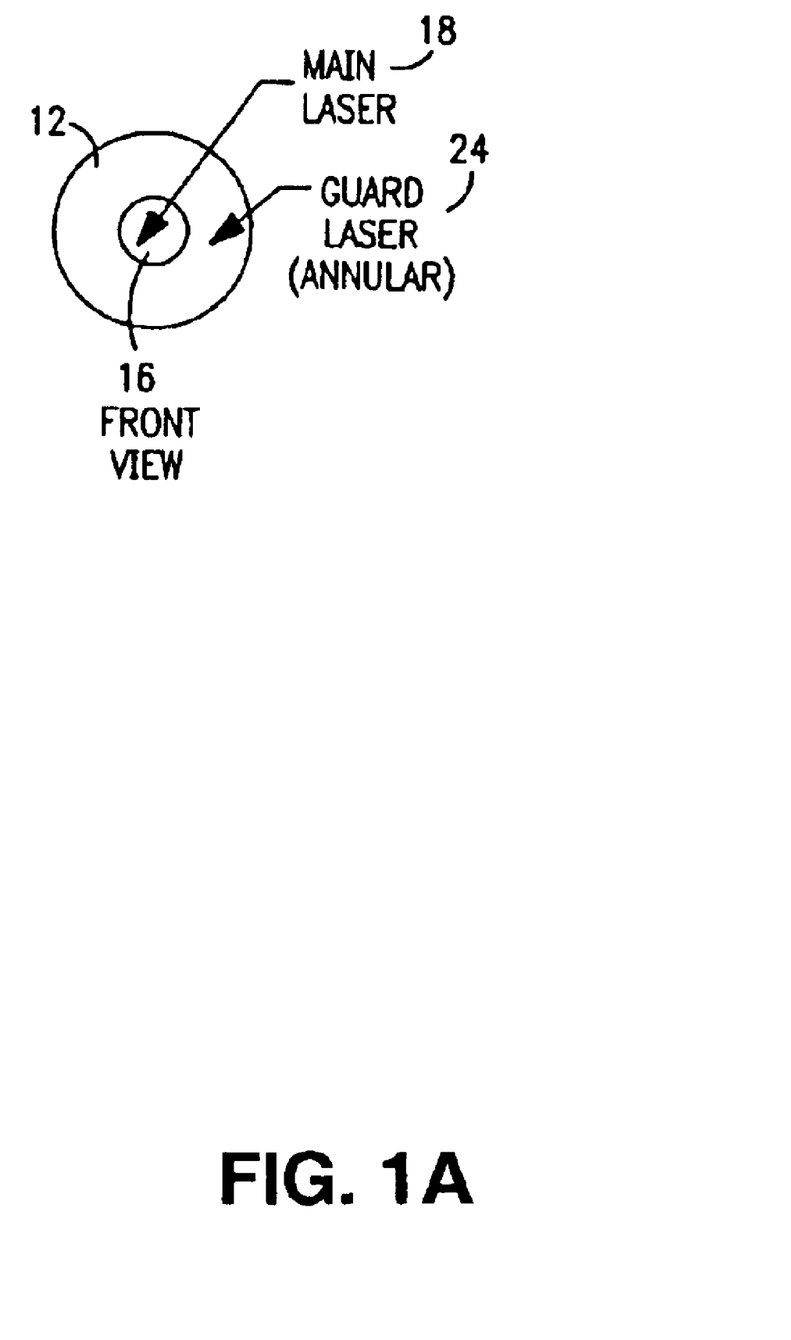
FIG. 1A is a cross-section of FIG. 1.
Figure 2:
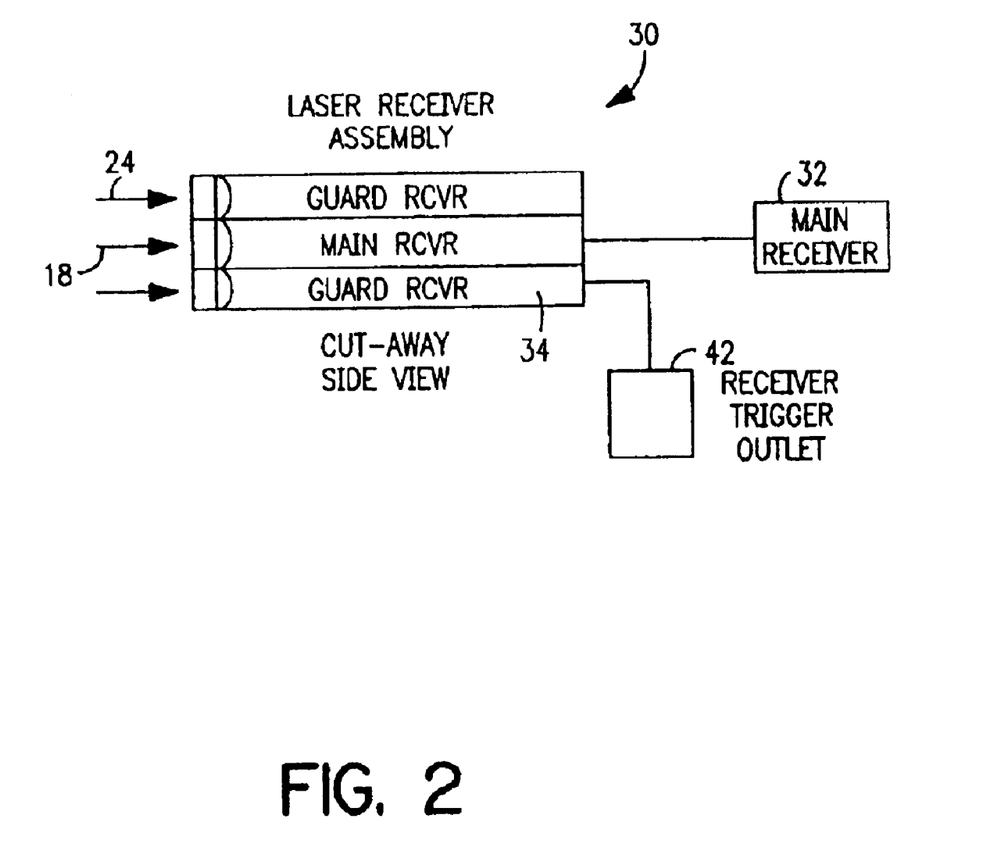
FIG. 2 is a representation of a laser receiver optically coupled to a laser transmitter in the system of FIG. 1.

In FIG. 1, a laser transmitter assembly 10 comprises, in one embodiment, a main continuous wave laser 12 typically comprising a rear mirror 14 and an output lens 16 projecting a laser beam 18 to a receiver 30 (see FIG. 2). A CW laser is well known in the art and described for example in U.S. Pat. No. 6,055,249. The laser is responsive to an input signal 19 surrounding and coaxially aligned with the laser 12 is a guard laser 20, as shown in FIG. 1A. Typically, the guard laser is a pulsed beam laser, which is well know in the art and described, for example, in U.S. Pat. No. 6,052,395. The guard laser includes a rear mirror 22 and a lens 23 surrounding the lens 16 and projecting a laser beam 24 to the receiver 30. Typically, the guard laser is a pulsed beam laser, which is well know in the art and described, for example, in U.S. Pat. No. 6,052,395. The guard laser includes a rear mirror 22 and a lens 23 surrounding the lens 16, and projecting a laser beam 24 to the receiver 30.

In an alternate embodiment, the guard band laser may consist of multiple pulsed lasers arranged concentric to the main laser rather than an annular guard band laser.

The CW laser 12 and the pulse beam laser may be constructed as a common assembly, sharing a common glass wall or may be built as two separate assemblies aligned along the same axis. An inset in FIG. 1 shows in one embodiment, a concentric alignment of the main laser beam 18 and the guard beam 24, respectively emanating from the lens 16 and the lens 23.

Figure 2A:
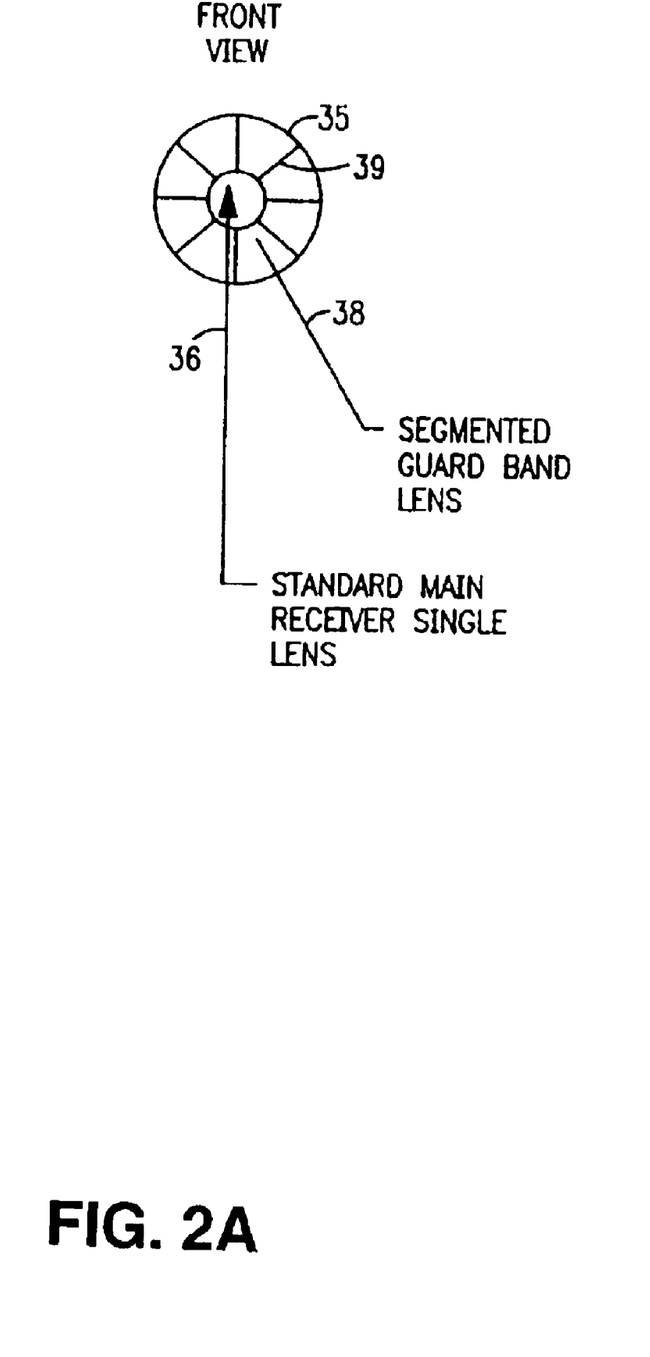
FIG. 2A is a cross-section of FIG. 2.

In FIG. 2, a receiver assembly 30 receives a main laser beam 18 and the coaxially or surrounding pulse guard band 24 through a lens array 35, as shown in FIG. 2A. A main laser receiver 32 translates the laser beam 18 into electrical signals as described, for example, in U.S. Pat. No. 5,056,111, assigned to the assignee of the present invention. Likewise, the guard beam 24 is translated by a guard band receiver 42 into an electrical signal for monitoring purposes, as will be described hereinafter in FIG. 3. The lens 35 includes a central single lens 36 for receiving the laser beam 18 and an annular segmented guard band lens 38 for receiving the guard band signal 24. The lens 38 serves as a set of parallel receivers 39.

In operation as a laser communication system, the guard band 24 surrounds and insulates the main beam from interruption. Typically, the guard band laser 20 is a low power laser, preferably a pulsed beam laser, and forms a toroid-shaped laser beam 24 about the main laser beam 18. The toroid-shaped laser beam is received by the lens assembly 38. Typically, the main laser beam 18 is a high-power laser using any conventional modulation scheme and the modulated main laser beam is received by the central lens 36. To prevent cross talk between laser's 12 and 20, different lasing materials and therefore different frequencies can be used. Likewise, if both lasers 12 and 20 are pulsed lasers, different pulse rates can be used.

If the guard band is interrupted at any point between the transmitter 10 and the receiver 30, the interruption can be detected by a break in signal in one or more of the segmented receivers 38. The number of receivers whose path is blocked will depend on the number of segments in the lens 35 and the size and the shape of the interfering object; When interruption occurs, the guard band will signal a guard trigger receiver 41 (see FIG. 3) to alter the performance of the main laser beam, including shut down, as will be described hereinafter. Since the main beam is modulated digitally, the orderly shutdown consists of buffering the current stream of bits or packets to be transmitted and deactivating the sustaining laser mechanism. The deactivation, which depends on the type of laser and the laser materials in use, may be a termination voltage or other laser acting as an energy pump. If the main laser is a pulsed laser, the orderly shutdown consists of simply not pulsing at the next time.

Once the intervening object has been cleared from the line of transmission, the guard band, which is never deactivated, will again activate all segments of the guard band receiver. At this point, the guard band generates a signal to the trigger receiver to return the main laser to normal operations.

If the guard band lasers transmitters and receivers are coaxially aligned with the main laser, a tight guard band can be constructed, based primarily on the radius of the annular laser with respect to the main laser. If the guard band receiver and the main laser are not coaxially aligned, a "fan out" guard band will result giving a coned-shaped guard band. A coned-shaped guard band may be desirably based on the location and positions of the transmitter and receiver, respectively, and the amount of safety arrangements required at each end.

Figure 3:
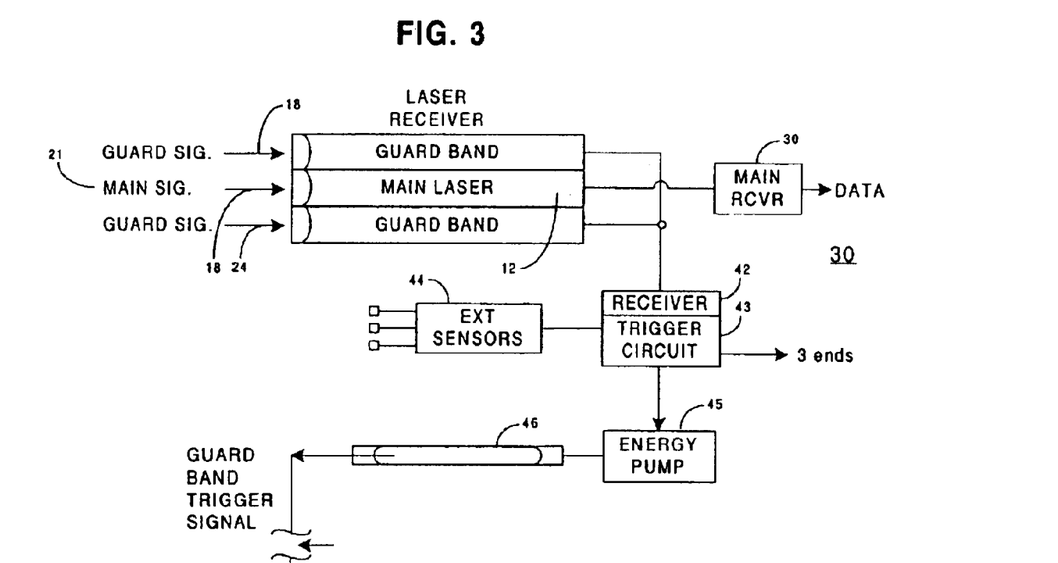
FIG. 3 is representation of the receiver of FIG. 2 sensitive to interruption of the guard band or climatic conditions and generating a return signal to alter the performance of the transmitter.
Figure 4:
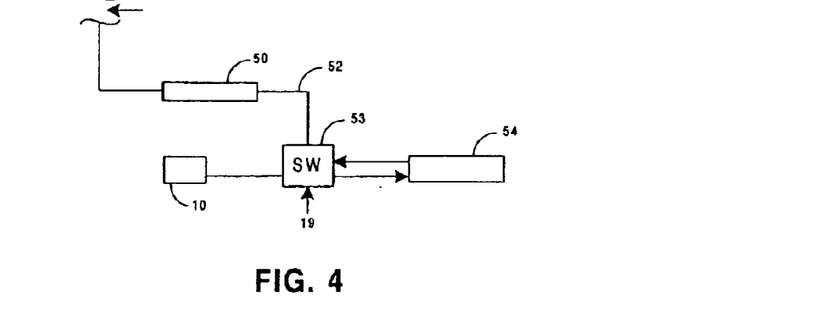
FIG. 4 is a representation of a switching system at the transmitter of FIG. 2 for recovery of data upon shut down of the transmitter upon interruption of the guard beam.

In FIG. 3, the laser receiver 30 is shown, including a guard band receiver 42 for detecting interruptions in the guard band 24 due to intervening objects. An electrical signal generated by the guard band laser receiver activates a conventional trigger circuit 43 to provide an output signal. A return laser 44, including an energy pump 45 for a laser emitter 46 is caused to be energized by the trigger signal and generates a return laser beam 48 to the transmitter 10. The return laser beam 48, when activated, indicates the guard band has been interrupted and the main laser power input should be altered or shut down, Turning to FIG. 4, the return laser beam 48 is provided to a receiver 50 located at the transmitter station 10. The receiver 50 provides an output electrical signal 52 to a switch 53 which also receives the input signal 19 to the main laser. When the return signal is absent, the switch 53 directs the input signal directly to the laser 12. When the laser signal 48 is active and the signal 52 is generated, the switch directs the input signal 19 to a buffer 54 which stores the input signal 19 until the switch 52 returns to the normal state. When the signal 52 terminates, the switch 53 discharges the buffer to the laser 12 followed by the input signal 19. The return band signal 52 can be either a binary on-off indicator or it may be a sophisticated signal to an amplifier (not shown) to increase or decrease the energy level of the main laser beam.

Returning to FIG. 3, the receiver 30 also includes climatic sensors 44 to avoid a shutdown of the main laser by the guard band laser due to predictable and not dangerous conditions to the main laser. For example, a driving rainstorm can cause signal disruptions in the lower power or different frequency of the guard band, but not disrupt the main laser. In such case, the climatic sensor would signal the trigger circuit 43 in the receiver 42 not to activate the return laser 44 and alter the performance of the main laser. Likewise, a dust cloud that disperses the guard band beam, but not the main laser, would be detected by a climatic sensor and the trigger circuit inactivated to prevent operation of the return laser 44. Thus, any broad, multi-signal interruption of the guard band receiver, coincident with climatic conditions, would be considered non interfering preventing the guard band trigger receiver from altering the performance of or shutting down the main laser.

Figure 5:
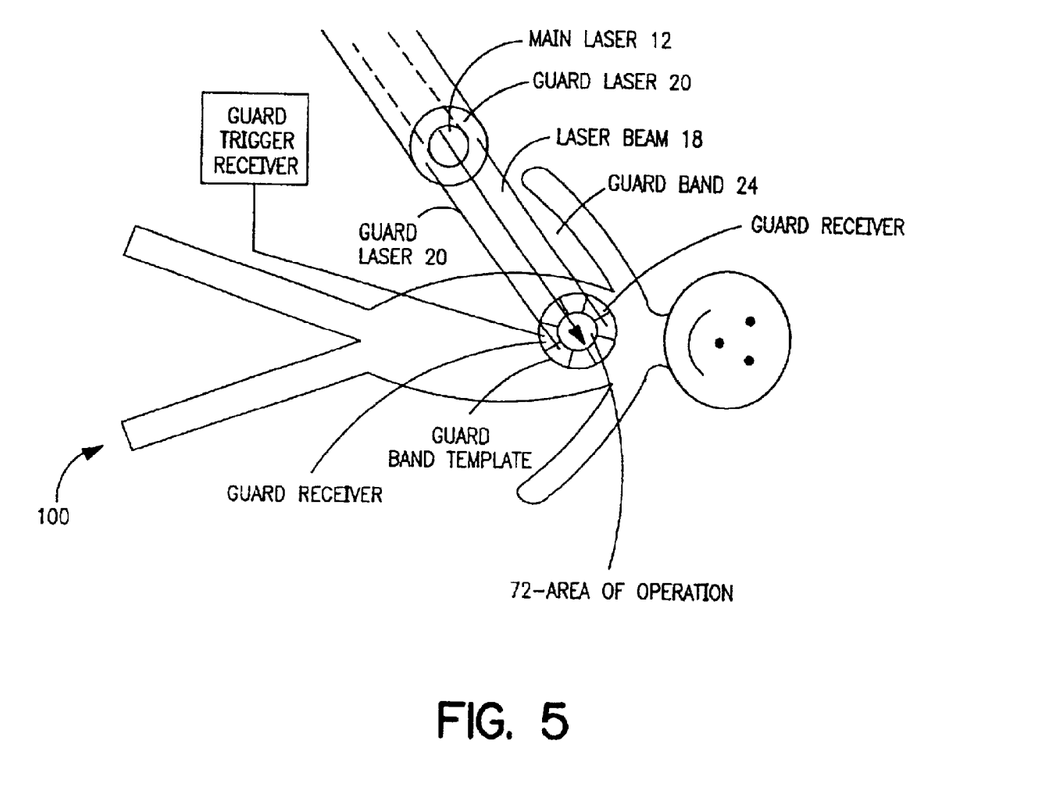
FIG. 5 is a representation of the laser system of FIG. 1 in a medical application.

Beside data communication system, the guard band laser 20 has application in laser surgery as shown in FIG. 5. A surgeon would outline a surgical area for an operation using a guard band template. As long as the main laser alignment was within the template area, the guard band laser would be received through each segment of the segmented guard band. As soon as the laser crossed over the guard band template, reception of the guard band would be disrupted on one or more of the segments and the main surgical laser would be interrupted.

In FIG. 5, a main laser 12 and guard band laser 20 generate a main laser beam 18 and a guard band laser beam 24. A patient 100 is receiving laser surgery within an area of operation 70. The patient is protected by a segmented guard band receiver template 70, which surrounds and exposes the operation area 72. During the operation, if the main laser beam departs from the operation area 72, the guard band laser beam would be incapable of illuminating all segments of the receiver template and the trigger circuit 43 would be activated to turn off the main laser. When the guard band laser was repositioned in the operation area to illuminate all segments of the template, the trigger circuit would be deactivated and the main laser beam turned back on to continue the surgery.

While the invention has been shown and described in a preferred embodiment, various changes can be made without departing from the spirit and scope of the invention as defined in the appended claims, in which:

We claim:

1. A laser system comprising:
   (a) a laser responsive to an input signal and generating a main beam;
   (b) a guard band laser arranged concentric to the main beam and generating a guard band beam to preserve input signal continuity in the main beam;
   (c) a guard band receiver spaced from the laser for receiving the guard band beam;
   (d) a trigger circuit coupled to the guard band receiver, the trigger circuit generating a return signal upon interruption of the guard band beam as detected by the guard band receiver;
   (e) means responsive to the return signal for altering the performance of the main beam by increasing the laser energy level or decreasing the laser energy level including termination; and
   (f) sensor means for detecting climatic conditions of dust, rain and other environmental elements affecting the guard band and preventing shutdown of the laser.

2. The laser system of claim 1 wherein the guard band laser is an annular laser.

3. The laser system of claim 1 wherein the guard band laser is a set of lasers arranged concentric to the laser.

4. A laser system having improved signal continuity and safety, comprising:
   (a) a laser including an energy source and optical surface in a chamber coupled to an energy pump and providing a laser beam responsive to an input signal;
   (b) a guard laser concentric with the laser including an energy source and an optical surface in a chamber coupled to an energy pump and providing a guard beam surrounding the laser beam as a protective layer for preserving input signal continuity of the laser beam;
   (c) a receiver spaced from the laser comprising a central lens for receiving the laser beam and coupled to the laser;
   (d) an annular, segmented set of mirrors and lenses surrounding the central lens as a set of parallel receiver for receiving the guard laser beam;
   (e) a trigger circuit connected to the set of parallel receivers for generating a signal upon interruption of the beam;
   (f) a return signal laser responding to guard band interruptions as sensed by the parallel receivers which activate the trigger circuit in generating a trigger signal to the return signal laser to shut down or modify the signal level of the laser beam by increasing or decreasing the energy level of the laser; and
   (g) sensor means for detecting climatic conditions of dust, rain and other environmental elements affecting the guard band, but not the signal continuity of the laser, and preventing shutdown of the laser in response to such climatic conditions.

5. The laser system of claim 4 further comprising:
a buffer circuit coupled to the laser for storing an input signal to the laser prior to shutdown.

6. The laser system of claim 4 wherein the guard beam is coaxially aligned with the laser beam.

7. The laser system of claim 4 wherein the guard beam is aligned and cone shaped with respect to the laser beam.

8. The laser system of claim 4 wherein the laser is a continuous wave laser.

9. The laser system of claim 4 wherein the guard laser is a pulsed laser.

10. A laser system having improved signal continuity and safety, comprising:
(a) a continuous wave laser including an energy source and optical surface in a chamber coupled to an energy pump and providing a laser beam;
(b) a pulsed guard laser concentric with the laser including an energy source and an optical surface in a chamber coupled to an energy pump and providing a coaxially aligned guard beam surrounding the laser beam as a protective layer;
(c) a receiver comprising a central lens for receiving the laser beam and coupled to a main receiver;
(d) an annular, segmented set of mirrors and lenses surrounding the central lens as a set of parallel receivers for receiving the guard laser beam;
(e) a trigger circuit connected to the set of parallel receivers for generating a trigger signal upon interruption of the guard beam;
(f) a return laser circuit means responsive to the trigger circuit and generating a return signal;
(g) switching means responsive to the input signal or the return signal;
(h) a buffer circuit coupled to the switching means for storing the input signal to the laser while the return signal is present;
(i) means for discharging the buffer circuit to the laser upon termination of the return signal; and
(j) means for sensing climatic conditions of dust, rain and other environmental elements affecting the guard beam and preventing shutdown of the laser in response to such climatic conditions.

11. In a laser system including a main laser optically coupled to a main lens receiver, a guard laser optically coupled to a segmented set of lenses surrounding the main lens and serving as parallel receivers for the guarder, a method of providing improved signal continuity and safety for the main laser, comprising the steps of:
(a) transmitting a laser beam from the main laser to the main lens in response to an input signal;
(b) transmitting and coaxially aligning a guard laser beam with the main laser beam as a protective layer surrounding the main laser beam and preserving the signal continuity of the input signal;
(c) receiving the main laser beam in the main lens;
(d) receiving the guard beam in the segmented set of parallel receivers;
(e) detecting an interruption in the protective layer by the set of parallel receivers;
(f) generating a return signal in response to the interruption of the protective layer;
(g) directing the input signal to a storage means while the return signal is present;
(h) altering the performance of the main laser beam in response to the return signal by increasing the laser energy level or decreasing the laser energy level including termination.

12. The method of claims 11 further comprising the step of:
(h) generating signals indicative of climatic conditions of dust, rain and other environmental elements affecting the guard laser beam; and
(i) preventing the termination of the main laser beam in response to such climatic conditions.

13. The method of claim 11 further comprising the step of:
(j) coupling a return laser to the generated signal for altering the performance including shutdown of the main laser in response to the generated signal.

14. The method of claim 11 further comprising the step of:
(j) coupling a return laser to the generated signal for altering the performance including shutdown of the main laser in response to the generated return signal.

15. The method of claim 14 further comprising the step of:
(l) restoring the stored signal and the input signal to the main laser upon termination of the generated return signal.

16. The method of claim 11 further comprising the step of:
(m) coupling a trigger circuit to the set of parallel receivers for producing the generated return signal when the protective layer is interrupted.

17. The method of claim 11 wherein the main laser transmits a continuous wave beam.

18. The method of claim 11 wherein the guard beam laser transmits a low power pulsed beam.

* * * * *